Patented Jan. 3, 1939

2,142,650

UNITED STATES PATENT OFFICE 2,142,650

METHOD OF PRODUCING CREAM

Carlton B. McLane, Venice, Calif.

No Drawing. Application May 2, 1936,
Serial No. 77,482

1 Claim. (Cl. 99—60)

This invention relates to a method of producing cream and has as its primary object the provision of a process whereby fresh milk may be converted into a highly palatable sterilized cream possessed of exceptional keeping properties while excluded from atmosphere at moderately low temperature.

In carrying out the invention any desired amount of whole fresh sweet milk is placed in a suitable container together with enough cream to produce the desired percentage of butter fat in the finished product. The mixture of cream and milk is then heated to a temperature of one hundred and seventy degrees F., and while maintained at this temperature a quantity of gelatine in the proportions of fifty one-hundredths of one per cent by volume of the milk and cream mixture dissolved in equal parts of boiling water is added to the heated milk and cream.

A mixture of one-hundredth of one per cent of salt and two one-hundredths of one per cent of cheese coloring by weight is added to the batch to impart flavor and color to the product.

The resultant mixture of milk, cream, gelatine, water, salt and coloring is maintained at a temperature of one hundred and seventy degrees F., for a period of at least twenty minutes which is sufficient length of time to effect thorough sterilization of the mixture and also to insure thorough dispersion of the melted gelatine throughout the mass; the mixture being agitated during this heating operation sufficiently to effect thorough admixture of the ingredients. At the conclusion of the heating operation the mixture is filtered and subjected to a cooling action such as to reduce the temperature of the mass as rapidly as possible to a temperature of fifty degrees F., the batch then being maintained at a temperature of fifty degrees F., for a period of approximately eight hours under continuous agitation. It is to be noted that a modicum or very small proportion of gelatine is employed. This is an important and essential feature of the invention since in order to produce a stable product having the consistency of cream, it is necessary to use such small amount of gelatine as not to cause the finished product to gel when standing at room temperature, and also not to cause expansion of the liquid under the agitation action as would result in production of the product known as "whipped cream".

By adding the gelatine before effecting the filtering operation, more impurities may be filtered out than where filtering is effected before adding the gelatine, since gelatine serves to hold animal matter so that a filter will more effectively act to remove impurities. The filtering step also acts to remove lumps and thereby render the mass smooth and uniform in consistency.

The agitation of the mass for approximately eight hours while maintained at a temperature of approximately fifty degrees F. insures such thorough intermixture of the materials as to render the product stable in its creamy consistency, so as to prevent separation of the ingredients while standing.

The batch is then allowed to stand in a quiescent state for approximately one hour thereby causing the mixture to gel.

The gelatinous mass thus formed is subjected to agitation for a period of thirty minutes whereby the gel is converted into a stable fluid constituting the finished product having the consistency, flavor and appearance of rich cream and having a predetermined butter fat content according to that imparted to the milk by the addition of the cream thereto.

It appears that the milk and cream mixture possesses some affinity for the gelatine since such complete combination of the gelatine with the milk and cream constituent is effected that no trace of gelatine can be found in the finished product by any of the usual tests employed for detecting gelatine.

The gelatine and salt act as preservatives with the salt also serving to add flavor to the product, while the cheese coloring imparts to the product the desired appearance of rich cream.

While I have set forth a specific embodiment of the invention such is given by way of example to enable those skilled in the art to practice same and I do not limit myself to the exact temperatures, or periods of time and proportions of ingredients specified, since a satisfactory product may be produced by employing approximately the given temperatures, duration of time and proportions of the ingredients. The essence of the invention resides in employing a modicum quantity of gelatine according to the quality used as will produce a gel at normal room temperatures and also in employing a heat treatment at temperatures to effect sterilization and thorough combining of the gelatine with the milk and cream mixture.

The cooling temperature is such as to insure rapid formation of the gel, and the period of rest is that which is sufficient to permit gelling of the mass. The final period of agitation is such as to convert the gel into a stable liquid having the consistency of unwhipped cream.

Any suitable proportions of salt to suit the taste and any suitable proportion of coloring according to the color appearance required may be employed and in some instances may be dispensed with.

I claim:

The method of forming an artificial cream consisting in heating a mixture of sweet milk and sweet cream to a temperature of approximately 170 degrees F., adding to the heated mixture a quantity of dissolved gelatine in the proportion of approximately fifty one-hundredths of one percent by volume of the milk and cream mixture dissolved in equal parts of boiling water, maintaining the batch at approximately the above named temperature under continuous agitation for a period of time sufficient to effect a thorough dispersion of gelatine throughout the mass, then subjecting the mass to a rapid cooling action and thereby reducing the temperature thereof to approximately fifty degrees F., and maintaining the mass at such reduced temperature under continuous agitation for approximately eight hours to produce a product having the consistency of cream.

CARLTON B. McLANE.